Dec. 15, 1953  E. J. MARTIN  2,662,996
MAGNETIC PICKUP
Filed Feb. 16, 1951

FLUX

VOLTAGE

Inventor
Edward J. Martin
By Willits, Helmig & Baillio
Attorneys

Patented Dec. 15, 1953

2,662,996

UNITED STATES PATENT OFFICE 2,662,996

MAGNETIC PICKUP

Edward J. Martin, Pleasant Ridge, Mich., assignor to General Motors Corporation, Detroit, Mich., a corporation of Delaware Application February 16, 1951, Serial No. 211,323

6 Claims. (Cl. 317—172)

This invention relates to a pickup unit and particularly to an improved form of magnetic type pickup which minimizes lag between the time a magnetic member passes the pickup core and the time an electrical pulse is generated.

In testing an internal combustion engine, such as an automobile engine, it is often necessary to provide an indication of the spark impulses from one cylinder or from a plurality of cylinders of the engine in order to test the operation of spark plugs, the spark advance angle, or other operating characteristics of the engine. In determining the amount of spark advance, it is common practice to utilize an electronic switching device which is triggered both by the spark impulses and by some other impulses of known relation to the operating cycle of the engine to provide an indication of the amount of spark advance.

In one testing device of this type, an impulse indicative of the spark from one of the cylinders is provided to trigger an electronic circuit and render the circuit conductive, and another impulse indicative of top dead center position of the piston in the cylinder is provided subsequently to trigger the electronic circuit and render it non-conductive. The proportion of the total time in a cycle when current flows is indicative of the spark advance angle, and this time may be determined by reading the average current flow through a meter which preferably is calibrated to give a direct reading in degrees of spark advance.

Certain types of indicating apparatus of this nature are fully disclosed in the patent to J. R. MacGregor, et al., which issued January 7, 1941, as Patent 2,228,032, and in the patent to K. R. Eldrege, which issued November 25, 1941, as Patent 2,263,859. Reference may be had, if desired, to these patents for a full disclosure of electronic indicating means which may be utilized with the pickup of this invention.

In providing voltage impulses indicative of the top dead center position of a piston in an engine cylinder, difficulties have been encountered in providing a pickup unit which accurately indicates when this position is reached. Magnetic pickups heretofore used in electronic spark advance indicators have had as much as an eight-degree lag at high speeds between the time a magnetic member passes the pickup core and the time the pulse is generated. Such a lag necessitates the use of speed correction charts in order to obtain the correct spark advance at all speeds.

A principal object of this invention, therefore, is to provide a pickup unit which is of particular utility in electronic spark advance indicators, wherein the "turn-off" pulse is generated by a magnetic pickup located near the flywheel and actuated by the change in magnetic flux as an inductor member having high magnetic permeability, such as a steel stud or bolt affixed to a flywheel on the crankshaft, passes the pickup coil. A further object of the invention is to provide a magnetic pickup which substantially reduces the aforementioned lag while also producing a sufficiently large output.

These and other objects are attained in accordance with the invention by providing a magnetic pickup having a core surrounded by a pickup coil which is removed from the immediate vicinity of the magnet or magnetizing winding. The pickup coil is thus located in a region where the flux pattern is easily and rapidly altered as the magnetically permeable inductor member passes the pickup, thereby maintaining lag at a minimum. For optimum results, the core is finely laminated and the pickup is provided with a pie wound coil having a low distributed capacity and a high self-resonant frequency, the low distributed capacity of the coil decreasing the period of self-oscillation and thereby producing sharp response characteristics.

The pickup core and the inductor which passes it are designed to have a sufficiently large cross-sectional area so that, as the stud passes the core, magnetic saturation does not occur. Laminating the core further reduces eddy currents to a minimum and permits the use of a much wider range of gap distances than is true with a solid core. With this laminated core construction, moreover, the rate of change of the voltage is greater than in the pickups heretofore used because the laminated core offers less resistance to the change in flux.

Other objects and advantages of the invention will more fully appear from the following description of the preferred embodiment of the invention shown in the accompanying drawing, in which: Figure 1 is a view in elevation of the magnetic pickup embodying the invention shown with relation to curves indicating the magnetic and electrical characteristics of the pickup in operation.

In this figure, 1a is a view in side elevation of the pickup and shows an inductor member having high magnetic permeability as it passes the pickup core tip, the arrow indicating the direction of movement of the inductor. 1b is a diagrammatic view showing the change in magnetic flux as the inductor passes the core tip of the magnetic pickup, the curve being shown with relation to the position of the pickup in 1a; 1c is a diagrammatic view showing the pulse generated as the inductor passes the pickup core tip, the voltage being plotted against time and the instantaneous voltage being shown with relation to the pickup and curve in 1a and 1b, respectively.

Figure 2 is an enlarged sectional view, with parts in elevation, of the magnetic pickup shown in 1a.

Figure 1:
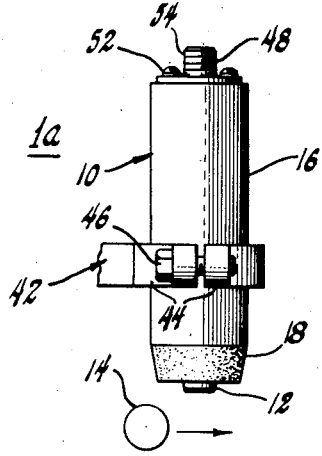
Figure 1:
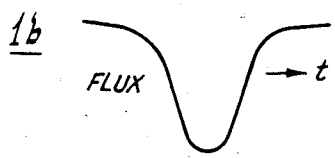
Figure 1:
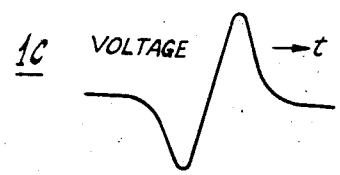

Referring more particularly to the drawing, in 1a is shown a magnetic pickup, indicated generally by 10, having a core tip 12 past which an inductor member 14 having high magnetic permeability is shown as moving. This inductor member, which may be in the form of a steel stud or bolt affixed to a flywheel or disc secured to a crankshaft, is preferably laminated to increase its magnetic permeability.

Figure 2:
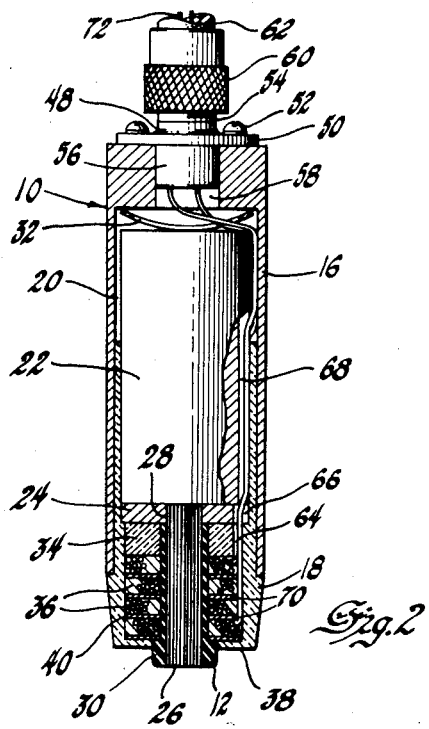
Figure 3:
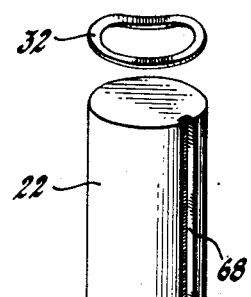
Figure 3 is an exploded view of the principal parts of the magnetic pickup shown in 1a and Figure 2.

As shown in Figure 2, the pickup has a cylindrical outer housing or casing 16, which may be of brass or other low permeability material, in which an insulating shell or sleeve 18 is concentrically fitted. This sleeve, preferably constructed of Micarta or similar substances, extends into the casing 16 to form with the latter a generally cylindrical bore or chamber 20. Positioned within the chamber defined by the casing 16 and the sleeve 18 is a permanent magnet 22, preferably of the Alnico type. Where a stronger magnetic field is required, an electromagnet could be substituted for this permanent magnet. However, since there is no flux change in a permanent magnet there is no demagnetization.

An annular plate 24 of magnetically permeable material, such as steel, hereinafter referred to as a pole piece, is fitted within the Micarta shell 18 with one face abutting the adjacent pole face of the magnet 22. The pole piece aids in directing the flux radially outwardly when the stud is not passing the pickup core and may be laminated to increase this effect. A pickup core 26 has one end thereof extending through the generally centrally located opening 28 in the pole piece and positioned against the adjacent pole face of the magnet 22. This pickup core is of a laminated construction and is shown in Figure 2 as comprising a multiplicity of wires of very small diameter, these iron wires being preferably of silicon steel and having a diameter in the order of 0.015 inch. The total cross-sectional area of the core should be sufficiently large to prevent magnetic saturation.

Encasing the pickup core 26 from the bottom pole face of the pole piece 24 to the core tip is a tube or sleeve 30 of insulating material which separates the core from the adjacent pickup parts. The magnet 22 is axially shown as positioned against the end of the core 26 and the adjacent face of the pole piece 24 by an annular sheet metal spring 32.

Abutting the lower face of the pole piece 24 and surrounding the adjacent portion of the insulating tube 30 is an annular separating plate or spacer 34, preferably of Micarta or other suitable insulating material having high magnetic reluctance. A pie wound coil 36, located between the spacer 34 and the lower end wall 38 of the sleeve 18, is wound around the tube 30, both the Micarta spaced 34 and the coil being positioned in the annular space between the Micarta sleeve and the insulating tube 30. This coil may consist of several hundred turns of a cotton-covered enameled wire of small diameter, the various segments of the coil 36 being spaced axially one from another and from the end 38 of the Micarta shell 18 by concentrically arranged thin discs or separators 40 of Micarta or other suitable insulating material.

The pickup may be attached to a supporting member, not shown, by the use of a mounting bracket, designated generally by 42, having yoke portions 44 which are clamped around the pickup casing 16 by a stud 46.

A connector 48, provided with a radially extending flange or plate portion 50, is shown as secured by screws 52 to the thick-walled upper end of the shell 16. As shown in Figure 2, this connector is preferably provided with a threaded upper end 54 and a tubular lower portion 56 which extends into an opening 58 in the adjacent end of the shell 16. A knurled nut 60 engages the threaded portion of the connector 48 and secures the ferrule of a conduit or cable 62 to the connector.

The insulating spacer 34, the pole piece 24 and the magnet 22 are all shown as provided with aligned, axially extending slots or grooves 64, 66 and 68, respectively. Similar slots 70 are formed in each of the insulating separators 40. This construction permits the pie wound coil wire 36 to pass through the separators and allows the terminal ends of the coil wire to pass through the slots 70, 64, 66 and 68 and the hollow connector 48 and into the connector portion 56. These wires are then connected to terminals of the connector 48, the terminals being in turn connected by electrical conductors 72 in conduit 62 to a suitable recording instrument, not shown, which indicates the change in voltage due to flux variations as the permeable inductor 14 passes the tip of the pickup core.

Alternatively, the connector could be designed to perform the dual function of attaching the pickup to a supporting surface and carrying the lead wires. In other instances it may be advantageous to use the connector merely for mechanical fastening and to pass the ends of the pie wound coil directly through the casing 16 or the sleeve 18 to the recording instrument.

As shown in 1b, the flux pattern produced by the magnet 22 is altered when the ferromagnetic inductor member 14 passes the end of the pickup core 26, many of the lines of force being momentarily changed from their normally rather laterally extending positions to more axially directed positions. This changing flux pattern causes the lines of force to cut the pickup coil 26, inducing a voltage pulse therein. The rate of flux pattern shift is again reduced to a minimum when the inductor is positioned approximately directly opposite the core tip.

During this first stage in the passage of the ferromagnetic inductor, as shown in 1c, a voltage impulse is generated as the magnetic field is attracted by the passing inductor and the flux density in the vicinity of the pickup coil is being raised to a maximum. This voltage is momentarily reduced to zero when the inductor is approximately opposite the core tip and the flux field is practically stationary, at which time the flux density near the pickup core is at a maximum. As the inductor continues to pass the core tip, the magnetic lines of force return to their original more laterally extending positions, thereby simultaneously cutting the coil 36 in the opposite direction and inducing a voltage impulse of opposite polarity. These voltage impulses produced at the output of the pickup coil register on a suitable recording device, mentioned above, as an indication of when the ferromagnetic inductor passes the core tip.

The pickup hereinbefore described provides an accurate and reliable magnetic means of generating an electrical pulse which does not appreciably shift in phase with changes in the speed of the magnetically permeable inductor member 14. Laminating the core 26 provides it with the desirable high resonant frequency and low inductance. Moreover, because there is less resistance to the change in magnetic flux when the core is laminated, the rate of change in voltage is considerably greater with this laminated core design than with the solid core pickups heretofore most frequently used. Hence, while solid core pickups have caused as much as an eight-degree error in the readings of a spark advance indicator, the present invention reduces this error to less than two degrees.

While the described embodiment of the present invention constitutes a preferred form, it is to be understood that other forms might be adopted, all coming within the scope of the following claims.

I claim:

1. A magnetic pickup comprising a magnet, a plurality of fine wires of magnetically permeable material constituting a core for said pickup, said core being generally coaxial with the magnet and having one end positioned against the adjacent pole face of said magnet, and a winding of electrically conductive material coiled around said core and electrically insulated therefrom, segments of said winding being axially separated one from another and from said pole face of the magnet by generally coaxial insulating spacers having central apertures in which the core is positioned.

2. A magnetic pickup comprising a permanent magnet, a finely laminated wire core coaxial with the magnet and having one end abutting a pole face thereof, the axis of the core being generally perpendicular to said pole face, a plurality of pie windings of electrically conductive material coiled around said core and electrically insulated therefrom, said windings being axially separated one from another by coaxial discs of insulating material having central apertures in which the core is positioned, and a casing having a high magnetic reluctance enclosing said magnet, core and winding and having an opening in one end through which the tip of said core extends.

3. A pickup for detecting changes in magnetic permeability, said pickup comprising a magnet, a laminated wire core coaxial with the magnet and having one end positioned against a pole face thereof, an apertured magnetically permeable plate coaxial with the magnet abutting said pole face, an insulating spacer positioned against the opposite side of the magnetically permeable plate and provided with an opening therethrough registering with the aperture in said plate, the adjacent end of said core being positioned in said aperture and opening, and a winding comprising a plurality of axially separated coil segments encircling the remaining portion of said core and electrically insulated therefrom, and a casing having a low magnetic permeability enclosing said magnet, core plate, spacer and winding, said casing being provided with an opening in one end through which the tip of the core protrudes.

4. A magnetic pickup for detecting the presence of adjacent magnetically permeable materials, said pickup comprising a permanent magnet, a finely laminated wire core having high magnetic permeability coaxial with the magnet and having one end positioned against a pole face thereof, a ferromagnetic pole piece having one face abutting the adjacent end of said magnet and having a central aperture in which said core is positioned, a spacer plate of insulating material positioned against the opposite side of said pole piece and provided with an aperture through which said core extends, a plurality of pie windings coiled around the remaining portion of said core and electrically insulated therefrom, coaxial annular insulating discs axially separating said pie windings, and a casing having a high magnetic reluctance enclosing said magnet, wire core, pole piece, spacer plate and discs, said casing being provided with an opening at one end through which the tip of the core extends.

5. A magnetic pickup for detecting the presence of adjacent magnetically permeable materials, said pickup comprising an elongated permanent magnet, a finely laminated wire core of high magnetic permeability material coaxial with the magnet and having one end thereof positioned against a pole face of said magnet, a ferromagnetic pole piece coaxial with the magnet and having one face abutting said pole face of said magnet, a spacer plate of insulating material coaxial with said pole piece, said plate member and spacer plate being provided with registering generally central openings through which the wire core longitudinally extends, a plurality of pie windings coiled around the remaining portion of said core and insulated therefrom, said pie windings being electrically insulated and axially separated one from another by coaxial annular insulating separators having registering central apertures in which the core is positioned, a sleeve of insulating material encasing said windings and separators, said sleeve being provided with an opening through which the tip of the core extends, and a casing having low magnetic permeability enclosing said magnet and provided with an open end into which said sleeve is fitted.

6. A magnetic pickup for detecting the presence of magnetically permeable materials, said pickup comprising an elongated permanent magnet, a finely laminated wire core of high magnetic permeability coaxial with the magnet and having one end positioned against the adjacent pole face of said magnet, an annular ferromagnetic pole piece coaxial with the magnet with one face abutting said pole face of the magnet, said pole piece being provided with a generally central aperture into which said end of the core is snugly positioned, an annular spacer plate of insulating material positioned against the opposite face of said pole piece, a pie wound coil encircling the remaining portion of said core, a tubular insulating member encasing said core and electrically insulating said core from said coil, coaxial annular insulating separators axially positioned between segments of said coil to electrically insulate one segment from another, said spacer plate and separators being provided with generally centrally located and registering apertures through which the tubular insulating member extends, a sleeve of insulating material encasing said coil and separators to maintain them in assembled position, said sleeve be provided with an opening through which the tip of the core protrudes, a casing of low magnetic permeability enclosing said magnet and having an open end in which said sleeve is fitted, a spring member positioned between the opposite pole face of the magnet and the adjacent inner end surface of said casing to resiliently maintain the magnet in contact with the end of the core and the abutting face of the pole piece, and a connector secured to said casing having terminals electrically connected to the lead ends of said coil.

EDWARD J. MARTIN.

References Cited in the file of this patent

UNITED STATES PATENTS

| Number | Name | Date |
| --- | --- | --- |
| 2,207,592 | Lenk | July 9, 1940 |
| 2,527,170 | Williams | Oct. 24, 1950 |
| 2,558,427 | Fagan | June 26, 1951 |

FOREIGN PATENTS

| Number | Country | Date |
| --- | --- | --- |
| 424,765 | Great Britain | Feb. 25, 1935 |
| 626,241 | Great Britain | July 12, 1949 |